US007241080B2

(12) United States Patent
Klobucar et al.

(10) Patent No.: US 7,241,080 B2
(45) Date of Patent: Jul. 10, 2007

(54) PUMP FOR TRANSFERRING PARTICULATE MATERIAL

(75) Inventors: Joseph M. Klobucar, Detroit, MI (US); James L. Pakkala, Livonia, MI (US); Mazen Haddad, Warren, MI (US); David J. Cole, Canton, MI (US)

(73) Assignee: Durr Industries, Inc., Plymouth, MI (US)

( * ) Notice: Subject to any disclaimer, the term of this patent is extended or adjusted under 35 U.S.C. 154(b) by 576 days.

(21) Appl. No.: 10/805,835

(22) Filed: Mar. 22, 2004

(65) Prior Publication Data

US 2005/0207901 A1 Sep. 22, 2005

(51) Int. Cl.
*B65G 53/66* (2006.01)

(52) U.S. Cl. .......................... 406/50; 406/98; 406/106; 406/127; 406/144; 406/146; 406/151

(58) Field of Classification Search ................. 406/50, 406/98, 106, 127, 144, 146, 151
See application file for complete search history.

(56) References Cited

U.S. PATENT DOCUMENTS 2,946,488 A * 7/1960 Kraft .......................... 222/134
3,260,285 A * 7/1966 Vogt .............................. 141/8
3,932,065 A * 1/1976 Ginsberg et al. ............ 417/317
4,521,165 A * 6/1985 Handleman ................. 417/393
4,893,966 A * 1/1990 Roehl ......................... 406/127
5,622,484 A * 4/1997 Taylor-McCune et al. .. 417/393
5,743,958 A 4/1998 Shutic
6,287,056 B1 * 9/2001 Szikszay ..................... 406/197
6,447,216 B1 * 9/2002 Higuchi et al. ............... 406/27
6,478,513 B1 * 11/2002 Higuchi et al. ............... 406/19
6,508,610 B2 * 1/2003 Dietrich ....................... 406/13
6,623,215 B2 * 9/2003 Dietrich ...................... 406/197
6,712,587 B2 * 3/2004 Gerhardt et al. ............ 417/390
6,929,454 B2 * 8/2005 Munzenmaier et al. ..... 417/403
6,953,315 B2 * 10/2005 Cartwright .................. 414/217
7,144,213 B2 * 12/2006 Cartwright .................. 414/217
7,150,585 B2 * 12/2006 Kleineidam et al. .......... 406/50
7,163,359 B2 * 1/2007 Moser ......................... 406/74
2001/0003568 A1 6/2001 Dietrich

* cited by examiner

*Primary Examiner*—Joe Dillon, Jr.
(74) *Attorney, Agent, or Firm*—Howard & Howard Attorneys, P.C.

(57) ABSTRACT

A pump for transferring particulate material from a source to a remote location, including a particulate chamber having open ends, check valves at the open ends, a vacuum source connected to the chamber adjacent one end, a gas source at the opposed end of the chamber and a control which alternatively connects the vacuum to the chamber to draw particulate material from the source to the chamber and connecting the gas under pressure to drive the particulate material to the remote location. In a preferred embodiment, the chamber has a cylindrical inner diameter and the source of vacuum is a venturi pump connected to a pinch valve permitting overflow of particulate material through the pinch valve and venturi pump, which is returned to the source. In one embodiment, the pinch valve surrounds an open end of the chamber permitting overflow while avoiding agglomeration of the particulate material.

29 Claims, 3 Drawing Sheets

PUMP FOR TRANSFERRING PARTICULATE MATERIAL

FIELD OF THE INVENTION

This invention relates to a pump for transferring particulate material including but not limited to powder paint, from a source of particulate material, such as a storage hopper, to a remote location, such as a feed hopper.

BACKGROUND OF THE INVENTION

In many applications, it is necessary to transfer particulate material from one location to another. For example, when applying particulate paint, commonly referred to as powder paint, in mass production applications, it is necessary to move the powder paint from a hopper in the powder paint storage room to the paint application area, wherein it is typically received in a feed hopper adjacent to the paint applicators.

In existing automotive powder paint application systems, the powder paint is transferred by a vacuum receiver system as disclosed, for example, in U.S. Pat. No. 5,743,958. As disclosed in more detail in U.S. Pat. No. 5,743,958, the powder paint transfer system includes a transport pipe, a receiver and a vacuum source which transfers the powder paint from a source, such as a storage hopper, to the application area. The receiver is a chamber or powder receiver coupled to a feed hopper. The vacuum source is connected to the receiver to withdraw air, substantially free from powder paint. The transport pipe is connected between the source of powder or particulate paint and the receiver to deliver a mixture of air and powder paint when the vacuum source is activated. The air/powder mixture enters the receiver and the powder paint is separated and collected, usually by a membrane filter. The air flows to the vacuum source and the collected powder is continuously or periodically discharged into the feed hopper. A gas-type sealing valve is required between the feed hopper and the receiver to avoid having gas flow from the feed hopper to the receiver. If the sealing valve is not included, this flow may impede the flow of powder paint from the receiver to the feed hopper or may prevent sufficient vacuum from being generated in the feed hopper to transport the powder from the source. There are several problems associated with the utilization of a vacuum to transfer particulate material, including powder paint, through a hose or line as disclosed in this patent. First, a vacuum is insufficient to transfer particulate material over long distances. The vacuum system disclosed in this patent is generally limited to about 100 feet. Further, the hose or line which conveys the powder paint must have a diameter of at least about two inches. Further, the powder paint is not conveyed in a dense phase and this system requires a receiver having a sealing valve, as described above.

Thus, it would be desirable to convey particulate material, particularly including powder paint, in a dense phase using a smaller delivery line over greater distances up to about 350 feet or greater. Further, it would be desirable to reduce the cost of the delivery system and eliminate the requirement for a receiver having a sealing valve system as described above. Reference is also made to U.S. Publication application 2001/0003568 A1 which discloses an apparatus for pneumatically conveying powder substances in a pipe system, wherein a volume is of powder is sucked in with reduced pressure and discharged with increased pressure. This apparatus includes a plurality of relatively small metering chambers (between 0.5 and 100 mm) and a metering pump which conveys the powder products in a metered continuously pulsating fashion. However, it is believed that the apparatus disclosed in this patent publication would not be suitable for powder paint and is relatively complex.

The pump for transferring particulate material of this invention is simple, yet rugged in construction and is particularly suitable for transferring powder paint which typically has a size range between 1 and 3 ○ m or generally in the range of 15 to 25 μm. The powder pump of this invention further transports the particulate material in a dense phase, eliminating the requirement for a receiver having a filtration system as described above and may be utilized to transfer particulate material at least 350 feet or greater.

SUMMARY OF THE INVENTION

As set forth above, this invention relates to a pump for transferring particulate material, including powder paint, from a source of particulate material, such as a storage hopper, to a remote location, such as a feed hopper. The particulate or powder pump of this invention includes a particulate chamber, preferably having a cylindrical internal diameter including a first open end and a second open end. The particulate chamber may have a diameter between 0.25 and 1.5 inches in diameter, wherein a preferred embodiment has an internal diameter of between 0.5 to one inch and a length to internal diameter ratio of at least 20 to 1 or preferably about 40 to 1 or greater.

The particulate pump of this invention further includes a first conduit connecting the first open end of the particulate chamber to the source of particulate material and a second conduit connecting the second open end of the particulate chamber to the remote location. The particulate chamber may be formed of stainless steel or other suitable material and the second conduit which connects the particulate chamber with the remote location may be a flexible hose or conduit formed of a polymeric material having a diameter of between ½ and ¾ inches. As set forth below, the particulate or powder pump of this invention transfers discreet volumes of particulate material from the source of particulate material to the remote location in a dense phase.

The particulate pump further includes a first valve at the first open end of the particulate chamber and a second valve at the second open end of the particulate chamber. In a preferred embodiment of the particulate pump of this invention, the first and second valves are check valves, such as ball check valves, which automatically sequentially open to fill the particulate chamber with particulate material and close to discharge particulate material from the particulate chamber to the remote location in discreet volumes. The particulate pump of this invention includes a source of vacuum connected to the particulate chamber adjacent the second open end and a source of gas under pressure connected to the particulate chamber adjacent the first open end. The particulate pump of this invention further includes a control which, alternatively: (1) connects the source of vacuum to the particulate chamber, opens the first valve, closes the second valve and drawing a vacuum in the particulate chamber, filling the particulate chamber with particulate material from the source through the first conduit; (2) connects the source of gas under pressure to the particulate chamber, closes the first valve, opens the second valve and drives the particulate material from the particulate chamber to the remote location through the second conduit; and (3) cyclically repeating steps (1) and (2) to transfer discreet volumes of particulate material in a dense phase from the source of particulate material to the remote location.

Where the first and second valves are check valves, such as ball check valves, connecting the source of vacuum to the particulate chamber automatically opens the first check valve and closes the second check valve and the vacuum in the particulate chamber then draws the particulate material from the source to the particulate chamber through the first conduit. Similarly, connecting the source of gas under pressure to the particulate chamber automatically closes the first check valve and opens the second check valve and drives the particulate material from the particulate chamber to the remote location through the second conduit in discreet volumes. A test prototype particulate pump as described above transferred 3.5 lbs/min of powder paint in a dense phase at 20 cycles per minute or 2.8 oz/cycle.

As will be understood, the efficiency of the particulate pump of this invention will be dependent in part on substantially completely filling the particulate chamber to each transfer cycle. Thus, it would be desirable to substantially completely fill the particulate chamber during each fill cycle. This is accomplished in the disclosed embodiment of the particulate pump by an overflow valve communicating with the source of vacuum and the source of vacuum is connected by a line to the source of particulate material, returning overflow particulate material from the particulate chamber to the source of particulate material. In one preferred embodiment, the source of vacuum is a venturi-type pump having a source of gas under pressure directed through a venturi nozzle which can receive and dispel overflow particulate material without damage to the venturi pump. A preferred embodiment of the overflow valve is a pinch valve which limits the overflow of particulate material from the particulate chamber and which may receive overflow particulate material with damage and directs the overflow to the venturi pump. In one preferred embodiment of the particulate pump of this invention, the pinch valve surrounds the second open end of the particulate chamber which is enclosed in an annular chamber surrounding the second open end of the particulate chamber connected to the venturi pump. The control is connected to the venturi pump limiting the overflow of particulate material to a minimum while substantially completely filling the particulate chamber with particulate material during each cycle of the particulate pump.

As will be understood, the pump for transferring particulate material of this invention is simple, yet rugged in construction providing important advantages over the prior vacuum systems and is particularly suitable for transferring particulate or particulate paint in a dense phase over distances exceeding 350 feet. Other advantages and meritorious features of the pump for transferring particulate material of this invention will be more fully understood from the following description of the preferred embodiments, the appended claims and the drawings, a brief description of which follows.

DESCRIPTION OF THE PREFERRED EMBODIMENTS

Figure 1:
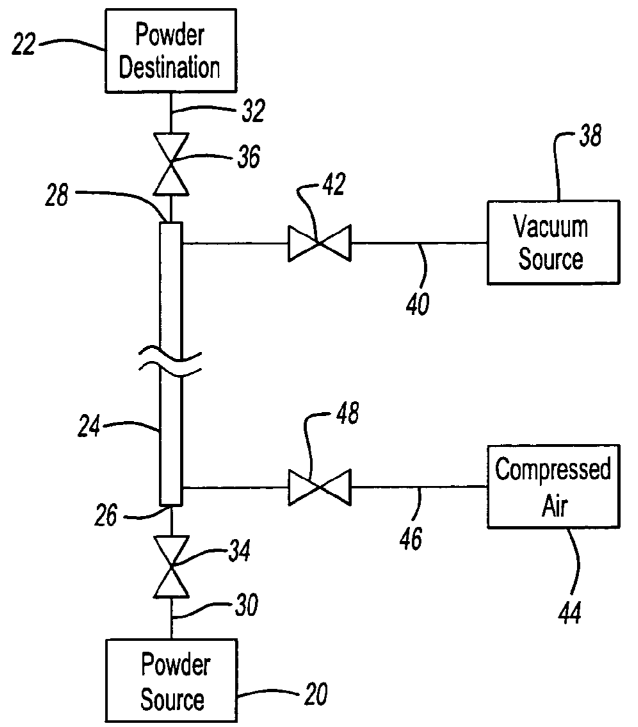
FIG. 1 is a schematic illustration of one embodiment of the powder pump of this invention.

As will be understood by those skilled in this art, the disclosed embodiments of the pump for transferring particulate material or powder pump of this invention may be modified within the purview of the appended claims. FIG. 1 is a schematic view of one embodiment of the pump for transferring particulate material of this invention in its simplest form. As described above, the pump for transferring particulate material or powder pump of this invention is adapted to transfer powder of particulate material from a powder source 20, such as a storage hopper, to a remote powder destination 22, such as a feed hopper. The powder pump of this invention is particularly, but not exclusively, adapted to feed particulate or powder paint which may range in particle size from 1 to 30 cm, typically in the range of 15 to 25 μm, in a dense phase, thereby eliminating the requirement for a vacuum receiver having a filter, as described above, and wherein the distance to the powder destination 22 may be 350 feet or greater. The powder pump includes a powder or particulate chamber 24 which in the preferred embodiment includes a generally cylindrical internal surface having a substantially constant cylindrical internal diameter. The pump chamber includes a first open end 26 and a second open end 28. A first conduit 30 connects the first open end 26 to the powder source 20 and a second conduit connects the second open end of the powder chamber 24 to the remote powder destination 22. The particulate or powder chamber 24 includes a first valve 34 adjacent the first open end 26 and a second valve 36 adjacent the second open end 28. As described further below, the first and second valves 34 and 36, respectively, are preferably check valves which respond to the pressure in the pump chamber 24 to open or close as described further below. The powder pump further includes a source of vacuum 38 connected by line 40 to the powder chamber 24 adjacent the second open end 28 and a valve 42 is provided in the line 40 to control the application of a vacuum to the powder chamber 24. The powder pump of this invention further includes a source of gas under pressure 44 connected by line 46 to the powder chamber 24 adjacent the first open end and a valve 48 is provided to control the application of gas under pressure to the powder chamber 24.

The operation of the powder pump shown in FIG. 1 may now be described as follows. First, the powder or particulate chamber 24 is filled by opening valve 42, connecting the source of vacuum 38 to the pump chamber 24 adjacent the second open end 28, and opening valve 34 in line 30 connected to the first open end 26 of the powder chamber 24 to the powder source 20. The vacuum source 38 then draws a vacuum in the powder chamber 24, drawing particulate material or powder from the powder source 20 into the powder chamber. The valves 34 and 42 are then closed and valves 48 and 36 are open, directing gas under pressure from the source of gas or compressed air 44 through line 46 to the powder chamber 24 adjacent the first open end 26, driving the particulate material from the powder chamber 24 through line 32 to the powder destination 22. This cycle may then be repeated indefinitely, alternately filling the powder chamber 24 with particulate material from the vacuum source 38 and discharging the particulate material in the powder chamber 24 to the powder destination 22 using a gas under pressure, such as compressed air 44.

Figure 2:
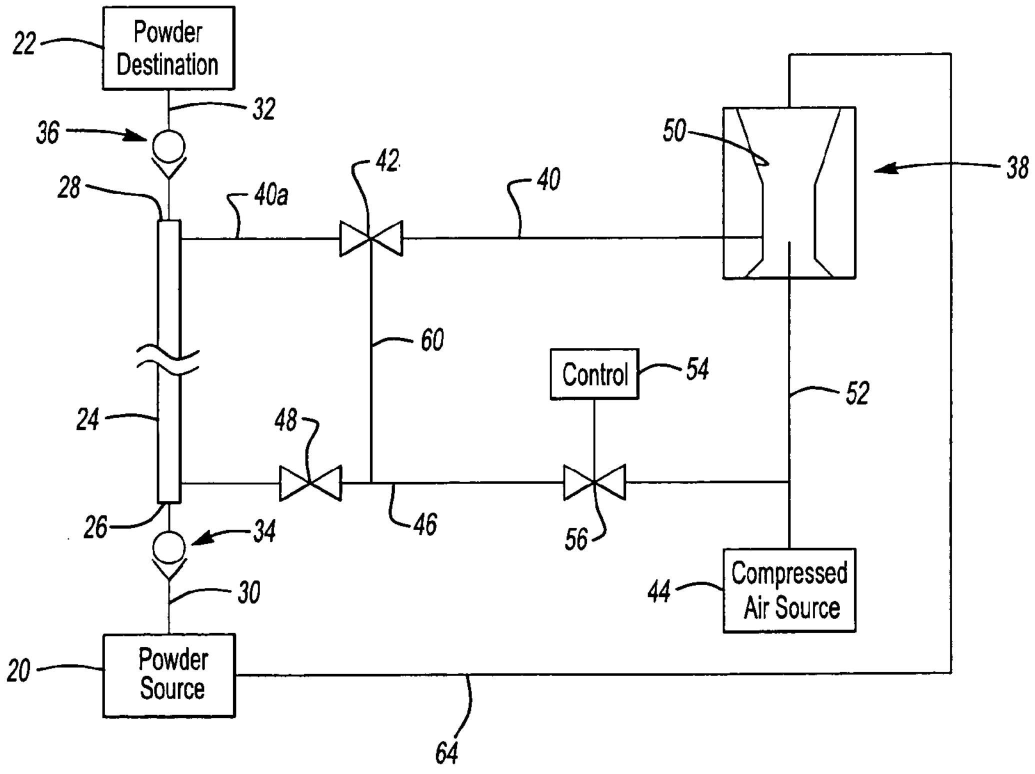
FIG. 2 is a schematic illustration of an alternative embodiment of the powder pump of this invention providing for complete filling of the pump chamber.

FIG. 2 illustrates an improved pump for transferring particulate material or powder pump which assures complete filling of the powder or particulate chamber 24 with each cycle of the pump. As described above, the powder pump illustrated in FIG. 2 includes a powder source 20, such as a storage hopper and a remote powder destination 22, such as a feed hopper. The powder or particulate chamber 24 includes a first conduit 30 connected to the first open end 26 of the powder chamber 24 and the powder source 20, which includes a first valve 34. preferably a check valve, such as a ball check valve as shown. The second open end 28 of the powder chamber 24 is connected to the powder destination 22 by a second conduit 32 having a second valve 36 which, in a preferred embodiment is also a check valve, such as a ball check valve as shown. In the embodiment of the powder pump shown in FIG. 2, the vacuum source 38 includes a venturi-type nozzle 50 and the compressed air source 44 includes a line 52 directing gas under pressure through the venturi nozzle 50 creating a vacuum in line 40 connected to the powder chamber 42 adjacent the second open end 28 as described above with regard to FIG. 1. The embodiment of the powder pump illustrated in FIG. 2 further includes a control 54 connected to valve 56 which, in combination, controls the operation of the powder pump as described below. The compressed air source 44 is also connected by line 46 to the powder or particulate chamber 24 adjacent the first open end 26 as described above and line 46 includes a valve 48. The valve 42 in line 40 in the embodiment of the powder pump illustrated in FIG. 2 is a pinch-type valve which is actuated by a pneumatic actuator 58 connected by line 60 to the compressed air source 44 through line 46. Line 62 connects the pinch valve 42 to the compressed air source 44. As will be understood by those skilled in this art, the pinch valve 42 may be opened or closed by directing gas under pressure through lines 60 and 62 by actuation of the control 54.

The operation of the pump for transferring particulate material or powder pump illustrated in FIG. 2 may now be described. The valve 56 connected to control 54 may be a normally open or normally closed valve. For purposes of description only, it will be assumed that the valve 56 is normally closed. A vacuum is drawn through line 40 to the particulate or powder chamber 24 through line 40 adjacent the second open end 28 of the powder pump 24 drawing a vacuum in the powder chamber 24, opening check valve 34 and closing check valve 36. Particulate material, such as powder paint, is then drawn into the particulate or powder chamber 24 through line 30 as described above with regard to FIG. 1. However, in the embodiment of the powder pump illustrated in FIG. 2, overflow of particulate material from the particulate chamber 24 is received through line 40, through the pinch valve 42, which is now open, and the overflow particulate material is received through line 40 into the venturi nozzle 50 and return line 64 to the powder source 20. The valve 56 is then opened by actuation of the control 54 which closes the pinch valve 42 and directs gas under pressure through line 46 to the particulate or powder chamber 24 adjacent the first open end 26. The gas pressure in the particulate chamber 24 then closes the check valve 34 and opens check valve 36, driving the particulate material in the powder or particulate chamber 24 to the remote powder destination 22 through line 32, connected to the second open end 28 of the particulate chamber 24. As described above with regard to FIG. 1, this cycle is repeated indefinitely, alternatively filling the particulate chamber 24 from powder source and driving the particulate material from the particulate chamber 24 to the remote powder destination 22 through line 32. The primary difference between the powder pump illustrated in FIG. 2 and the powder pump illustrated in FIG. 1 is that the powder pump illustrated in FIG. 2 assures substantially complete filling of the particulate chamber 24 during each cycle of the powder pump with the requirement of a metering device because the particulate chamber 24 is filled to overflowing during the fill cycle.

It was found during testing of the embodiment of the powder pump illustrated in FIG. 2 that the combination of a venturi-type vacuum source, including the venturi nozzle 50, and the pinch valve 42 is able to tolerate powder paint without substantial wear. Thus, the embodiment of the powder pump disclosed in FIG. 2 is more efficient in the delivery of powder paint from the powder source 20 to the remote powder destination 22. An important advantage of the embodiment of the powder pump illustrated in FIG. 2 is that the entire system is controlled by one control 54 as described above. However, extended testing of the embodiment of the powder pump illustrated in FIG. 2 resulted in agglomeration and build up of powder paint in the section **40*a* of the line 40 between the pinch valve 42 and the second open end 28 of the particulate chamber 24. As will be understood by those skilled in this art, however, the agglomeration and build up of particulate material in the line section 40*a* will be dependent upon the characteristics of the particulate material and thus the embodiment of the powder pump illustrated in FIG. 2** may be preferred in certain applications.

Figure 3:
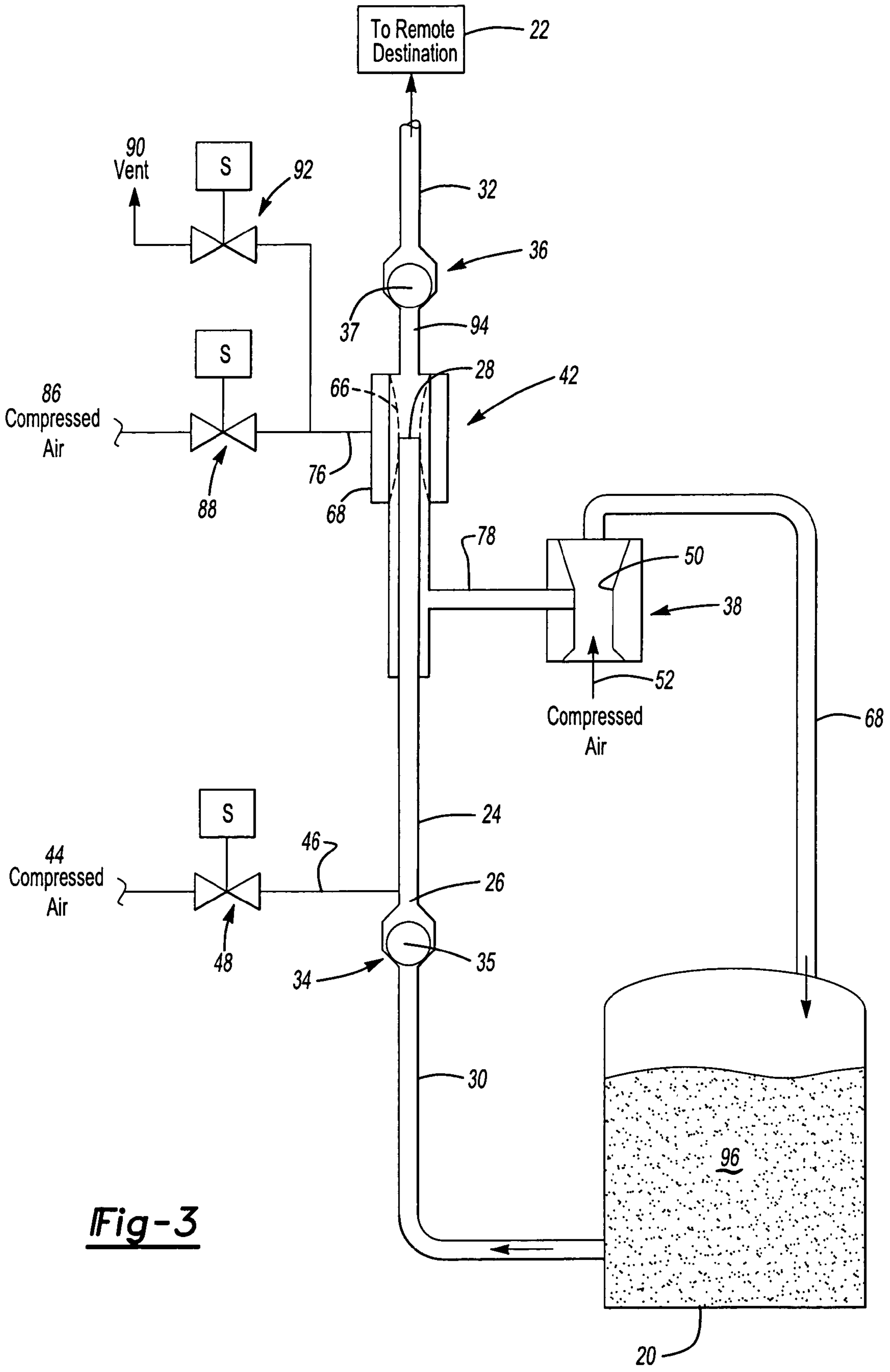
FIG. 3 is a partially schematic view of an improved embodiment of the powder pump of this invention.
Figure 4:
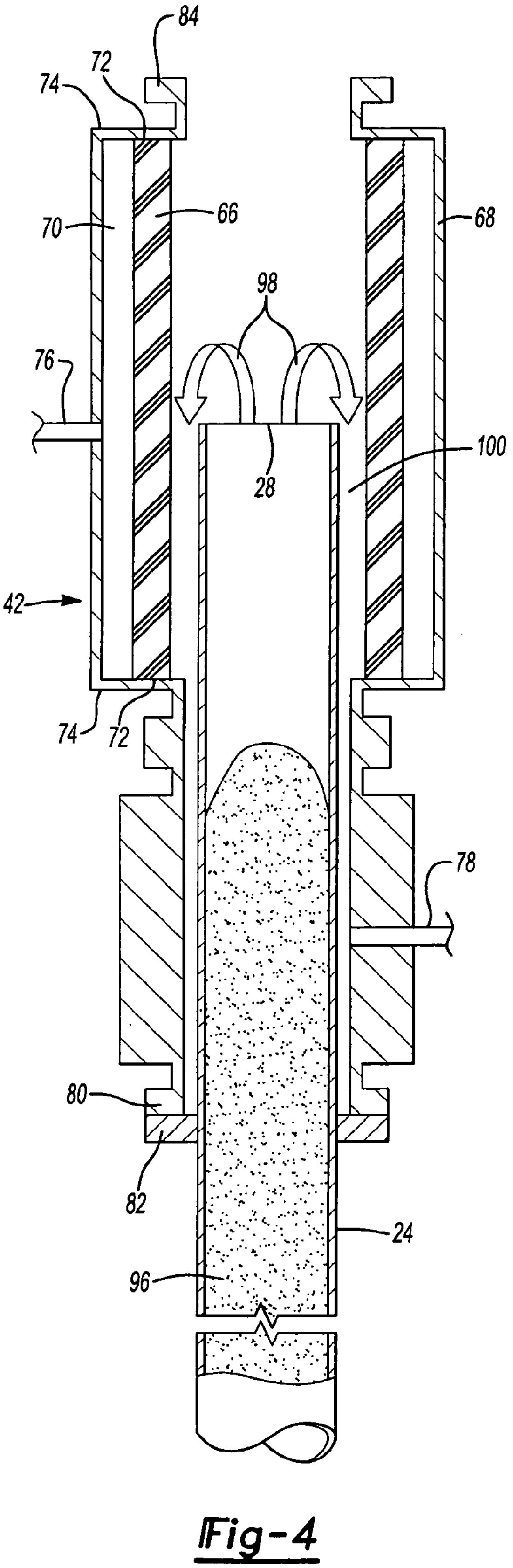
FIG. 4 is a side cross-sectional view of the pinch valve assembly of the powder pump shown in FIG. 3 in the open position.
Figure 5:
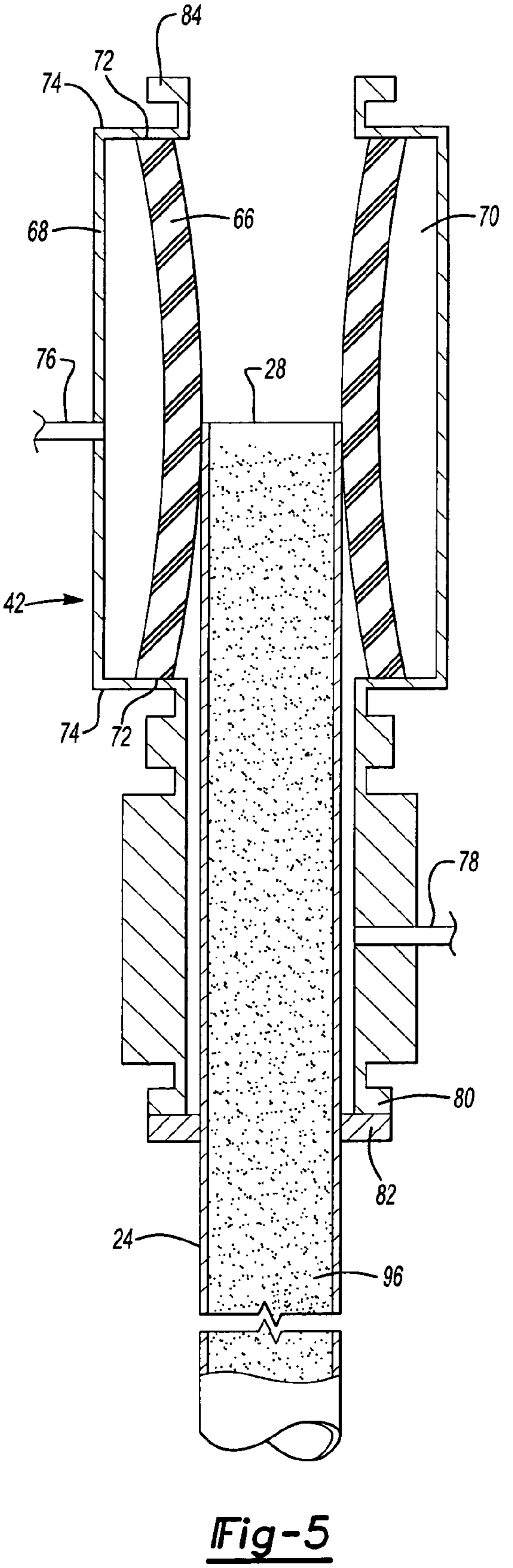
FIG. 5 is a cross-sectional view of FIG. 4 with the pinch valve closed.

FIGS. 3 to 5 illustrate a preferred embodiment of the pump for transferring particulate material of this invention which is adapted to transfer powder paint from a source of powder paint 20, such as a storage hopper, to a remote destination 22, such as a feed hopper. As described above, the powder chamber 24 includes a first open end 26 connected by a first conduit 30 to the source of powder paint 20 and the second open end 28 of the powder paint chamber 24 is connected by a second conduit 32 to the remote destination 22. A ball check valve 34 having a ball 35 is located at the first open end 26 of the powder chamber 24 and a second ball check valve 36 having a ball 37 is located at the second open end 28 of the powder chamber 24. Thus, the general configuration of the powder pump illustrated in FIG. 3 may be identical to the powder pumps illustrated in FIGS. 1 and 2 described above. The primary difference between the powder pump illustrated in FIGS. 3 to 5 and the powder pump illustrated in FIG. 2 is the location of the pinch valve 42 surrounding the second open end 28 of the powder chamber 24 and the utilization of three controls for the pump operation as now described.

The improved pinch valve 42 used in the powder pump shown in FIG. 2 is disclosed in more detail in FIGS. 4 and 5. As shown, the pinch valve 42 includes a resilient tube 66, preferably formed of an elastomeric material, surrounding the second open end 28 of the powder chamber 24 which is enclosed within a housing 68 defining an annular chamber 70 surrounding the elastomeric tube 66 and the ends 72 of the elastomeric tube 66 are fixed to radial portions 74 of the housing such that the midportion will resiliently flex inwardly to engage the powder chamber 24 adjacent the second open end 28 upon receipt of pneumatic pressure through inlet 76 as shown in FIG. 5. The housing 68 further includes a powder outlet 78 which receives powder overflow from the powder chamber 24 as described below. The housing 68 further includes a lower radial flange 80 which receives a locking member 82 which affixes the housing in sealed relation to the powder chamber 24 and an upper flange 84 which receives the second conduit 32 which is not shown in FIGS. 4 and 5.

Having described a suitable embodiment of a pinch valve 42, reference is again made to FIG. 3. The powder pump shown in FIG. 3 includes a vacuum source 38 connected by line 78 to the housing 68 of the pinch valve 42 shown schematically in FIG. 3. As described above with regard to FIG. 2, the vacuum source includes a venturi nozzle 50 which receives compressed air through line 52 described more fully in the description of FIG. 2. The gas inlet 76 is connected to a source of compressed air 86 through solenoid valve 88 and the vent 90 to the inlet line 76 is controlled by solenoid valve 92. Finally, as described above, a source of compressed air 44 is connected to the powder chamber 24 adjacent the first open end 26 by line 46, which is controlled by a further solenoid valve 48. As will be understood, the sources of compressed air 44, 86 and the compressed air received through line 52 may be a common source.

The operation of the powder pump shown in FIG. 3 is similar to the operation of the powder pump shown in FIG. 2 and will now be described. First, a vacuum is drawn in the powder chamber 24 by driving compressed air through line 52 through the venturi orifice 50 as described above with regard to the embodiment of the powder pump of FIG. 2. The vacuum in the powder chamber 24 opens the first check valve 34 by lifting the ball 35 and closes the second check valve 36 by drawing the ball against the conduit 94. Powder paint 96 is then drawn from the source of powder paint 20 into the powder chamber 24 through the first conduit 30, filling the chamber 24 as shown in FIG. 4. During the filling cycle, the valves 48 and 88 are closed and the valve 92 of the vent 90 is open, such that the pinch valve 42 is open as shown in FIG. 4. The powder paint 96 then fills the powder chamber 24 and the powder paint overflow is then received into the annular space 100 surrounding the second open end 28 of the powder chamber 24 as shown by arrows 98. The overflow powder is then received through the outlet 78 into the venturi nozzle 50, where it is directed through line 68 back to the powder source 20. The valves 48 and 88 are then opened and the vent valve 92 is closed, such that compressed air is received through inlet line 76, resiliently biasing the midportion of the resilient tube 66 inwardly as shown in FIG. 5, closing the pinch valve 42. The compressed air received from source 44 to line 46 adjacent the first open end 26 of the powder chamber 24 then closes the check valve 34 and opens check valve 36, driving powder paint in the powder chamber 24 through the second conduit 32 to the remote destination 22. The pinch valve 42 shown in FIGS. 4 and 5 virtually eliminate agglomeration and build up of powder paint as described above with regard to the powder pump of FIG. 2. However, the powder pump of FIG. 3 retains the advantages of the powder pump of FIG. 2 of substantially completely filling the powder chamber 24 during each fill cycle of the powder pump. As set forth above, this cycle can be repeated indefinitely, alternatively filling the powder chamber 24 from the source 20 with powder paint 96 and discharging the powder paint in the powder chamber 24 through the second conduit 32 to the remote destination 22 in a dense phase.

The configuration of the powder chamber 24 is important to the efficient operation of the embodiments of the powder pump shown in FIGS. 1, 2 and 3. In a preferred embodiment of the particulate or powder chamber 24, the inside diameter is cylindrical and substantially constant throughout its length to avoid any agglomeration or build up of powder in the particulate or powder chamber. The dimensions of the particulate or powder chamber 24 are also important to the efficient operation of the powder pump. In a preferred embodiment, the inside diameter of the powder chamber is between 0.25 to 1.5 inches or more preferably between 0.5 and one inch. The length of the powder chamber may range from 1 to 5 feet or greater, but is preferably between about 3 and 5 feet, such that the inside diameter to length ratio is greater than 20 to 1, or more preferably 40 to 1 or greater. The powder pump shown in FIGS. 2 and 3 has efficiently operated to deliver 3.5 lbs/min at 20 cycles per minute or about 3 oz/cycle.

As set forth above, the powder pump of this invention may be utilized to efficiently deliver powder paint or particulate material over relatively long distances. In tests of the embodiments of the powder pump shown in FIGS. 2 and 3, the powder pump efficiently delivered powder paint 350 feet, but it is believed that the distance of delivery can be substantially greater. In a preferred embodiment of the powder pump, the second conduit 32 is a flexible tube formed of any suitable material, including polyvinyl chloride or polyvinyl acetate. The diameter of the second conduit 32 is also preferably relatively small, particularly in comparison with the vacuum delivery systems. The powder or particulate chamber 24 may also be formed of any suitable material. However, to avoid abrasive wear, the powder chamber 24 is preferably formed of an abrasive resistant material, such as stainless steel but may, for example, be formed of steel or aluminum, preferably having a wear resistant internal coating. Although the internal surface is preferably cylindrical, the outer surface may have any configuration. As described above, the powder pump of this invention may be utilized to deliver any particulate material from a source of particulate material to a remote location. However, the embodiment of the powder pump illustrated in FIG. 3 has been found to be particularly suitable for the delivery of powder paint as used, for example, by the automotive industry, wherein the particle size ranges from 1 to 30 μm or more typically between 15 and 25 μm. However, the simplified control of the embodiment of the powder pump shown in FIG. 2 may be preferred for other applications, particularly where the particulate material is not subject to agglomeration.

Having described preferred embodiments of the pump for transferring particulate material or powder pump of this invention, it will be understood by those skilled in this art that various modifications may be made within the purview of the appended claims. For example, the preferred dimensions of the powder or pump chamber 24 will be somewhat dependent upon the particulate material transferred. Further, in certain applications, conventional valves may be utilized at the open ends of the particulate chamber, although check valves are simple and efficient in this application. As used herein, the term check valve includes any valve which is responsive to the pressure in the powder chamber 24 including but not limited to ball check valves. In a preferred embodiment of a ball check valve, the ball is preferably formed of a resilient material, such as synthetic or natural rubber, but may also be formed of a synthetic polymer. Further, although a pinch valve in combination with a venturi-type vacuum source is preferred in powder paint applications and to substantially completely fill the powder chamber 24 during each cycle of the powder pump by providing overflow of the particulate material from the powder chamber 24, a conventional source of vacuum and valve may be utilized as shown in FIG. 1, wherein the filling and discharge of the particulate chamber is controlled by timing the opening and closing of the valves. Finally, as will be understood, the preferred gas under pressure will also depend upon the particulate material transferred, although pneumatic pressure or compressed air will be preferred when air does not interact with the particulate material. In such cases, nitrogen or an inert gas may be preferred.

The invention claimed is:

1. A pump for transferring particulate material from a source of particulate material to a remote location, comprising:

a particulate chamber having a first open end and a second open end;

a first conduit connecting said first open end of said particulate chamber to said source of particulate material and a second conduit connecting said second open end of said particulate chamber to said remote location;

a first check valve at said first open end and a second check valve at said second open end of said particulate chamber;

a source of vacuum connected to said particulate chamber adjacent said second open end;

a source of gas under pressure connected to said particulate chamber adjacent said first open end; and a control, alternately (1) connecting said source of vacuum to said particulate chamber, thereby opening said first check valve, closing said second check valve and drawing a vacuum in said particulate chamber filling said particulate chamber with particulate material from said source of particulate material through said first conduit;

(2) connecting said source of gas under pressure to said particulate chamber, thereby closing said first check valve, opening said second check valve and driving said particulate material from said particulate chamber to said remote location through said second conduit; and (3) cyclically repeating steps (1) and (2) to transfer discreet volumes of particulate material from said source of particulate material to said remote location.

2. The pump for transferring particulate material as defined in claim 1, wherein said particulate chamber is generally cylindrical having a substantially constant cylindrical internal diameter.

3. The pump for transferring particulate material as defined in claim 2, wherein said cylindrical internal diameter of said particulate chamber is between 0.25 and 1.5 inches.

4. The pump for transferring particulate material as defined in claim 2, wherein said cylindrical internal diameter of particulate chamber is between 0.5 and one inch.

5. The pump for transferring particulate material as defined in claim 2, wherein said particulate chamber has a length to internal diameter of at least 20 to 1.

6. The pump for transferring particulate material as defined in claim 1, wherein said particulate chamber includes an outlet communicating with said source of vacuum receiving an overflow of particulate material from said particulate chamber and said source of vacuum is connected to said source of particulate material returning said overflow of particulate material from said particulate chamber to said source of particulate material.

7. The pump for transferring particulate material as defined in claim 6, wherein said source of vacuum is a venturi pump including a venturi nozzle and a source of compressed gas under pressure directed through said venturi nozzle.

8. The pump for transferring particulate material as defined in claim 6, wherein said pump includes a pinch valve limiting said overflow of particulate material to said source of vacuum.

9. The pump for transferring particulate material as defined in claim 8, wherein said outlet is said second open end of said particulate chamber, said pinch valve surrounding said second open end of said particulate chamber and said pinch valve connected by a line to said source of vacuum.

10. The pump for transferring particulate material as defined in claim 9, wherein said pinch valve is enclosed within an annular chamber surrounding said second open end of said particulate chamber and said line to said source of vacuum is connected to said annular chamber.

11. The pump for transferring particulate material as defined in claim 1, wherein said check valves are ball check valves.

12. The pump for transferring particulate material as defined in claim 11, wherein said ball check valves include a ball formed of a resilient material.

13. The pump for transferring particulate material as defined in claim 12, wherein said ball is formed of rubber.

14. The pump for transferring particulate material as defined in claim 1, wherein said pump includes a particulate overflow valve communicating with said source of vacuum and said source of vacuum is connected by a line to said source of particulate material returning overflow of said particulate material from said particulate chamber to said source of particulate material and wherein said discreet volumes of particulate material are substantially a volume of said particulate chamber.

15. A pump for transferring powder paint from a source of powder paint to a remote location, comprising:

a powder paint chamber having a substantially constant cylindrical internal diameter including a first open end and a second open end;

a first conduit connecting said first open end of said powder paint chamber to said source of powder paint and a second conduit connecting said second open end of said powder paint chamber to said remote location;

an inlet valve at said first open end of said powder paint chamber and an outlet valve at said second open end of said powder paint chamber;

a source of vacuum connected to said powder paint chamber adjacent said second open end;

a source of gas under pressure connected to said powder paint chamber adjacent said first open end; and a control, alternately (1) connecting said source of vacuum to said powder paint chamber, opening said inlet valve, closing said outlet valve and drawing a vacuum in said powder paint chamber filling said powder paint chamber with powder paint from said source of powder paint through said first conduit;

(2) disconnecting said source of vacuum from said powder paint chamber and connecting said source of gas under pressure to said powder paint chamber, closing said inlet valve, opening said outlet valve and driving said powder paint from said powder paint chamber to said remote location through said second conduit; and (3) cyclically repeating steps (1) and (2) to transfer discreet volumes of powder paint from said source of powder paint to said remote location.

16. The pump for transferring powder paint as defined in claim 15, wherein said inlet and outlet valves are check valves, whereby connecting said source of vacuum to said powder paint chamber opens said inlet valve and closes said outlet valve and connecting said source of gas under pressure to said powder paint chamber closes said inlet valve and opens said outlet valve.

17. The pump for transferring particulate paint material as defined in claim 16, wherein said check valves are ball check valves, each including a ball formed of a resilient material.

18. The pump for transferring powder paint material, as defined in claim 15, wherein said cylindrical internal diameter of said powder paint chamber is between 0.25 and 1.5 inches.

19. The pump for transferring powder paint as defined in claim 15, wherein said pump includes an overflow valve communicating with said source of vacuum and said source of vacuum connected by a line to said source of powder paint returning overflow of powder paint from said powder paint chamber to said source of powder paint, whereby said powder paint chamber is substantially filled with powder paint upon connecting said source of vacuum to said powder paint chamber and said discreet volumes of powder paint are substantially the volume of said powder paint chamber.

20. The pump for transferring powder paint as defined in claim 15, wherein said particulate paint chamber has a length to internal diameter ratio of at least 20 to 1.

21. The pump for transferring powder paint as defined in claim 15, wherein said source of vacuum is a venturi pump including a venturi nozzle and a source of compressed gas under pressure directed through said venturi nozzle.

22. The pump for transferring powder paint as defined in claim 21, wherein said powder paint chamber includes an outlet communicating with said venturi nozzle receiving an overflow of powder paint from said powder paint chamber and said venturi nozzle connected to said source of powder paint by a line receiving overflow powder paint from said venturi nozzle connected to said source of powder paint.

23. The pump for transferring powder paint as defined in claim 22, wherein said outlet is said second open end of said powder paint chamber and said pump includes a pinch valve surrounding said second open end of said powder paint chamber and said pinch valve is connected by a line to said venturi pump.

24. The pump for transferring powder paint as defined in claim 23, wherein said pinch valve is enclosed within an annular chamber surrounding said second open end of said powder paint chamber and said line to said venturi pump is connected to said annular chamber.

25. A pump for transferring powder paint from a source of powder paint to a remote location, comprising:

a powder paint chamber having a substantially constant cylindrical internal diameter including a first open end and a second open end;

a first conduit connecting said first open end of said powder paint chamber to said source of powder paint and a second conduit connecting said second open end of said powder paint chamber to said remote location;

a ball check valve at said first open end and a second ball check valve at said second open end of said particulate paint chamber;

a source of vacuum connected to said powder paint chamber adjacent said second open end;

a source of gas under pressure connected to said powder paint chamber adjacent said first open end;

a powder paint overflow valve adjacent said second open end of said powder paint chamber receiving overflow of powder paint from said powder paint chamber;

a line between said powder paint overflow valve communicating with said source of powder paint returning said overflow of powder paint to said source of powder paint; and a control, alternately:

(1) connecting said source of vacuum to powder paint chamber, thereby opening said first ball check valve, closing said second ball check valve and drawing a vacuum in said powder paint chamber, filling said powder paint chamber with powder paint from said source of powder paint through said first conduit and closing said powder paint overflow valve when said powder paint substantially fills said powder paint chamber;

(2) connecting said source of gas under pressure to said powder paint chamber, thereby closing said first ball check valve, opening said second ball check valve and driving said powder paint from said powder paint chamber to said remote location through said second conduit; and (3) cyclically repeating steps (1) and (2) to transfer predetermined discreet volumes of powder paint substantially equal to a volume of said powder paint chamber from said source of powder material to said remote location.

26. The pump for transferring powder paint as defined in claim 25, wherein said overflow valve is a pinch valve and said source of vacuum is a venturi vacuum pump including a venturi nozzle and a source of gas under pressure directing gas and overflow powder paint under pressure through said venturi nozzle.

27. The pump for transferring powder paint as defined in claim 26, wherein said line includes a first line connected between said pinch valve and said venturi vacuum pump and a second line between said venturi vacuum pump and said source of powder paint.

28. The pump for transferring powder paint as defined in claim 26, wherein said pinch valve surrounds said second open end of said powder paint chamber.

29. The pump for transferring powder paint as defined in claim 28, wherein said pinch valve is enclosed within an annular chamber surrounding said second open end of said powder paint chamber and said line is connected between said annular chamber and said venturi vacuum pump.

* * * * *

UNITED STATES PATENT AND TRADEMARK OFFICE

CERTIFICATE OF CORRECTION

PATENT NO. : 7,241,080 B2
APPLICATION NO. : 10/805835
DATED : July 10, 2007
INVENTOR(S) : Joseph M. Klobucar et al.

It is certified that error appears in the above-identified patent and that said Letters Patent is hereby corrected as shown below:

Column 11, line 5, please delete “particular paint material” and insert --powder paint--.

Column 11, line 23, please delete “particular paint chamber” and insert --powder paint chamber--.

Signed and Sealed this

Twenty-seventh Day of November, 2007

JON W. DUDAS
*Director of the United States Patent and Trademark Office*